United States Patent
Liu et al.

(10) Patent No.: US 10,990,720 B1
(45) Date of Patent: Apr. 27, 2021

(54) METHOD FOR DESIGNING PHASOR ALGORITHMS OF PHASOR MEASUREMENT UNITS BASED ON COMPLEX BANDPASS DIGITAL FILTERS

(71) Applicant: NORTH CHINA ELECTRIC POWER UNIVERSITY, Beijing (CN)

(72) Inventors: Hao Liu, Beijing (CN); Tianshu Bi, Beijing (CN); Sudi Xu, Beijing (CN)

(73) Assignee: North China Electric Power University, Beijing (CN)

( * ) Notice: Subject to any disclaimer, the term of this patent is extended or adjusted under 35 U.S.C. 154(b) by 0 days.

(21) Appl. No.: 17/136,675

(22) Filed: Dec. 29, 2020

Related U.S. Application Data

(63) Continuation of application No. 16/936,004, filed on Jul. 22, 2020, now Pat. No. 10,915,677.

(51) Int. Cl.
   *G06F 30/20*      (2020.01)
   *G06F 17/14*      (2006.01)
   *H04L 27/20*      (2006.01)
   *H04L 29/08*      (2006.01)
   *G06F 111/10*     (2020.01)

(52) U.S. Cl.
   CPC ............ *G06F 30/20* (2020.01); *G06F 17/141* (2013.01); *H04L 27/20* (2013.01); *G06F 2111/10* (2020.01); *H04L 67/10* (2013.01)

(58) Field of Classification Search
   CPC .................................................. H04L 27/0014
   USPC ........................................................ 375/344
   See application file for complete search history.

(56) References Cited

U.S. PATENT DOCUMENTS

| | | | |
|---|---|---|---|
| 6,141,196 A | 10/2000 | Premerlani et al. | |
| 7,415,495 B1 * | 8/2008 | Anaclerio | G06F 30/00 708/819 |
| 2008/0059088 A1 | 3/2008 | Atanackovic et al. | |

* cited by examiner

*Primary Examiner* — Shuwang Liu
*Assistant Examiner* — Gina M McKie
(74) *Attorney, Agent, or Firm* — Hunton AK, LLP

(57) ABSTRACT

A general design method for phasor estimation algorithms on different applications is described based on a complex finite impulse response (FIR) band-pass filter. To facilitate the design of the complex band-pass filter for different requirements and reduce the trial and error process, a design framework based on the error mathematical models is described. Using an absolute value inequality theorem, the general error models between the filter gain and the error limitations of all the valuables measured by phasor measurement units (PMUs) are established separately. The filter design criteria obtained by the error models can determine the passband and stopband gain range of complex band-pass filters.

1 Claim, 7 Drawing Sheets

(a) Phasor errors in the AM tests　　　(b) Phasor errors in the PM tests

METHOD FOR DESIGNING PHASOR ALGORITHMS OF PHASOR MEASUREMENT UNITS BASED ON COMPLEX BANDPASS DIGITAL FILTERS

BACKGROUND

Phasor measurement units (PMUs) can realize synchronized dynamic monitoring of power systems, and thus, they are widely deployed in transmission and distribution networks. With the rapid development of renewables, flexible transmissions and active loads, power systems are becoming increasingly complex. As a result, PMUs for different scenarios and applications are needed.

SUMMARY

It is an object of the present disclosure to provide for phasor estimation methods for different scenarios and applications. In one example embodiment, a general design method for phasor estimation algorithms on different applications is described based on a complex finite impulse response (FIR) band-pass filter. To facilitate the design of the complex band-pass filter for different requirements and reduce the trial and error process, a design framework based on the error mathematical models is described. Using an absolute value inequality theorem, the general error models between the filter gain and the error limitations of all the valuables measured by phasor measurement units (PMUs) are established separately. The filter design criteria obtained by the error models can determine the passband and stopband gain range of complex band-pass filters.

Additionally, three phasor algorithms for different classes of PMUs are analyzed, and their performance are compared with experimental tests. The results demonstrate that the described method can design phasor algorithms to provide accurate measurements under different scenarios. In particular, when compared with the existing filter design criteria, the described error models have the following advantages. First, the amplitude error (AE) and phase error (PE) limitations are utilized in analyzing the filter gain range. Second, the magnitude response of the differentiator is considered in the analysis of the frequency error (FE) and rate-of-change-of-frequency (ROCOF) error (RFE) limitations. Third, the suppression of the negative fundamental component is considered to determine the stopband gain range. Fourth, the influence of frequency deviation and reporting rate is considered for phase modulation signals, and thus the error models can be applied for both frequency-tracking and fixed filters. The test results show that the described method can design different classes of phasor algorithms with excellent measurement performance.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Figure 1:
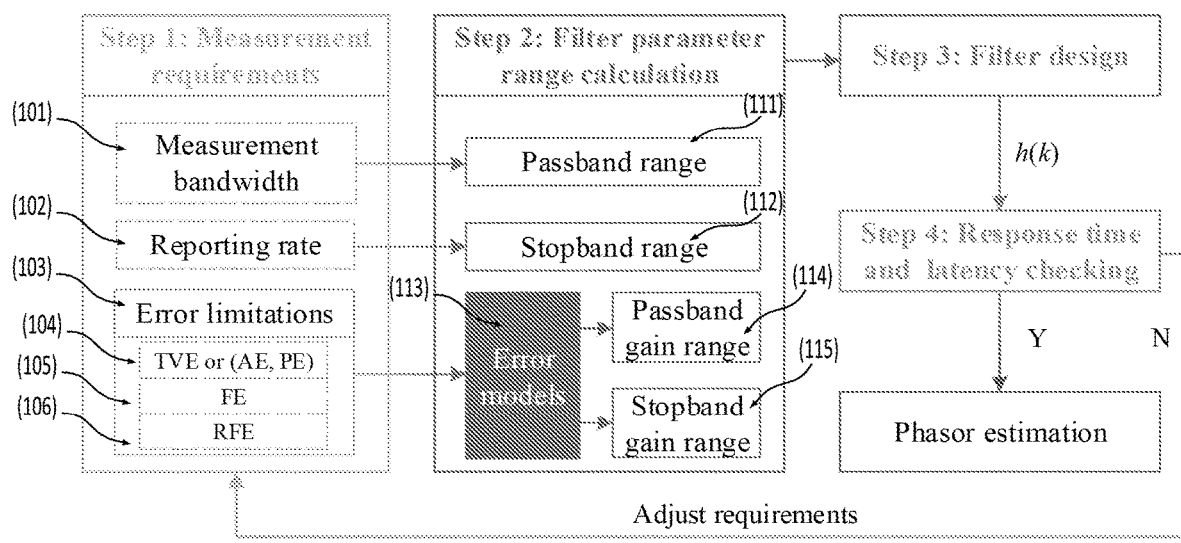
FIG. 1 shows an example framework for a design method for phasor estimation based on complex band-pass filters.

Exemplary embodiments of the invention will now be described in order to illustrate various features of the invention. The embodiments described herein are not intended to be limiting as to the scope of the invention, but rather are intended to provide examples of the components, use, and operation of the invention.

Phasor measurement units (PMUs) can realize synchronized dynamic monitoring of power systems, and thus they are widely deployed in transmission and distribution networks. PMUs are classified into P- and M-classes in IEEE standards ("IEEE Std."). The P-class PMU is suitable for protection applications and needs fast response speed. Additionally, it has a narrow measurement band and no need for rejecting out-of-band (OOB) interferences. The M-class PMU has a wider measurement bandwidth and needs to suppress OOB interferences with different frequency bands at different reporting rates.

However, with the rapid development of renewables, flexible transmissions and active loads, power systems are becoming increasingly complex. As a result, PMUs for different scenarios and applications are needed. For instance, there has been many reports of sub-synchronous oscillations (SSOs) in the areas with high penetration of renewables. PMUs have become one of the tools used to monitor SSOs in real time because of their high reporting rate and synchronization. Therefore, to conduct monitoring of power systems under different scenarios, and achieve their effective control, phasor estimation methods with good performance must be developed and studied for different classes of PMUs.

Some phasor estimation methods can be mainly classified into time-domain and frequency-domain methods. The time-domain methods, such as the Gauss-Newton method and Kalman filter method, require accurate signal models. However, some signal models only contain fundamental and harmonic components without inter-harmonics, thereby resulting in a weak ability to suppress out-of-band (OOB) inter-harmonics. Besides, some methods use iterative techniques to calculate phasors, thereby causing a heavy computational burden. Furthermore, some time-domain methods may suffer from the problem of numerical instability in engineering applications.

The frequency-domain methods may be used because of the simplicity of their calculation and their stable measurement performance. The frequency-domain algorithms use the complex band-pass filter with the passband center at the fundamental frequency to extract the fundamental phasor. The design methods of the complex band-pass filter can be divided into two categories. One is based on Taylor Fourier Transform (TFT). This method uses Taylor series to approximate the time-varying amplitude and phase, and then the weighted least square (WLS) method is used to solve the coefficients of Taylor series to obtain the coefficients of complex band-pass filter. However, the TFT filtering characteristics are only determined by the data window length, the order of Taylor series, and the weight coefficient, leading to its poor adjustability. In addition, the TFT has a poor anti-interference capability. To this end, harmonic and inter-harmonic signals can be included in the TFT model, but the number of interference signals must be estimated in advance, which increases the computational burden. Therefore, using the TFT method to estimate synchrophasor may not be ideal in some circumstances.

The other design method is based on discrete Fourier Transform (DFT). This type of method designs a finite impulse response (FIR) lowpass filter according to the standard requirements, and then uses the DFT to obtain the coefficients of the complex band-pass filter. The DFT based method is flexible and applicable. The window function design is commonly used to design lowpass filters, such as hamming, Taylor, and flat-top window. However, this method is not the optimal method for filter design, and it cannot customize the gain of frequency bands. As such, it is difficult to effectively suppress the negative fundamental component.

Therefore, the estimation performance of the frequency-domain methods is determined by the filtering characteristics of the complex band-pass filters. To facilitate the design of filters and reduce trial and error, the filter design criteria may specify the range (e.g., stopband and passband gain) of filter parameters. The filter parameter range with total vector error (TVE) limitations may be analyzed, and the influence of frequency error (FE) and rate-of-change-of-frequency (ROCOF) error (RFE) limitations on the filter parameter range can be considered. Additionally, the influence of frequency deviation may be considered in amplitude modulation (AM) and phase modulation (PM) tests, and the design criteria. Also, the influence of frequency and ROCOF measurement algorithm on the filter parameter range can be considered in OOB tests. In addition, the influence of the suppression of the negative fundamental component on the filter parameter range may be analyzed. Furthermore, some PMU standards have specific requirements for amplitude error (AE) and phase error (PE). The filter parameter range under may be considered provided AE and PE limitations.

In one example embodiment, the complex band-pass filter is selected to design phasor algorithms. One has to determine the filter parameter range to design the complex band-pass filter. To address the above-mentioned problems, a general design method for phasor estimation in different scenarios is described. In particular, based on the absolute value inequality and error limitation distribution, the requirements of passband and stopband gain of the complex band-pass filter are determined separately. Then, the general error models between error limitations (TVE, AE, PE, FE, and RFE) and filter passband and stopband gain are constructed to determine the filter parameter range.

Moreover, the influence of the negative fundamental component, multiple interference components, frequency deviation under modulation conditions, and the differentiators-based frequency and ROCOF estimation algorithm on the filter parameter range is considered in the error models to enhance their applicability. According to the framework of the design method described in this disclosure, three classes of phasor estimation methods are designed, and their estimation performance is evaluated by experimental tests and compared with other estimation methods.

PMU Estimation Models

A. Phasor Estimation

The power signal can be expressed as follows:

$$y(t)=x(t)+\eta(t)=\sqrt{2}a(t)\cos(\varphi(t))+\eta(t) \quad (1)$$

where x(t) is the fundamental signal; a(t) and φ(t) are the time-varying amplitude and phase, respectively; η(t) is the interference signals (e.g., harmonics and OOB inter-harmonics).

Based on Euler's formula, the fundamental signal x(t) in (1) can be rewritten as:

$$x(t) = \frac{\sqrt{2}}{2}a(t)[e^{j\varphi(t)} + e^{-j\varphi(t)}] = \frac{\sqrt{2}}{2}[X^+(t) + X^-(t)] \quad (2)$$

Equation (2) indicates that the fundamental signal is composed of symmetrical positive ($X^+(t)$) and negative ($X^-(t)$) frequency components in the frequency domain.

According to the definition of a synchrophasor, the fundamental phasor of the power signal in (1) is $$X^\&(t)=a(t)e^{j\varphi(t)}e^{-j2\pi f_n t}=X^+(t)e^{-j2\pi f_n t} \quad (3)$$

where $X^\&$ represents the synchrophasor to be reported, and $f_n$ denotes the nominal frequency ($f_n$=50 Hz in this example, and thus $e^{-j2\pi f_n t}$ can be determined). Therefore, if $X^+(t)$ is estimated, the synchrophasor can thereby be obtained.

Since the frequency components of $X^+(t)$ are mainly concentrated in the frequency band near $f_n$ (called measurement bandwidth), a phasor estimation algorithm can be designed as a band-pass digital filter to extract $X^+(t)$. The passband of the band-pass filter must contain the measurement band to ensure the accurate extraction of $X^-(t)$. In addition, to eliminate the influence of η(t) on the phasor accuracy and avoid frequency aliasing during reporting the phasors, the band-pass filter must remove harmonics and OOB inter-harmonics. Thus, the stopband range of the band-pass filter must be lower than $f_n-F_r/2$ and over $f_n+F_r/2$ ($F_r$ is the reporting rate). It should be noted that $X^-(t)$ is also included in the stopband and its magnitude is far larger than that of harmonics or OOB inter-harmonics. To ensure phasor accuracy, the filter gain near $X^-(t)$ must be less than that of other stopbands.

Let the FIR band-pass filter coefficients be h(k) (0≤k≤2N, where 2N is the filter order), and then the positive fundamental component can be obtained by:

$$z(k) = \sum_{i=0}^{2N} h(i)y(k - N + i) \quad (4)$$

where y(k) is the discrete power signal, and z(k) is the measured positive fundamental component. The time stamp is marked in the middle of the data window to eliminate the phase shift. It should be noted that y(k) is a real number and z(k) is a complex number; therefore, h(k) is a complex band-pass filter.

Then, the synchrophasor at the report time can be obtained according to the definition of the synchrophasor in (3):

$$\dot{X}(k)=z(k)e^{-j2\pi f_n t_k} \quad (5)$$

where $\dot{X}(k)$ is the discrete phasor and $t_k$ is the report time.

B. Frequency and ROCOF Estimation

The frequency and ROCOF estimation methods can be divided into two types. One is based on the first derivative and second derivative of the phasor, which may be used in the TFT based methods. For this method, the influence of the FE and RFE limitations on the parameter range of h(k) can be analyzed. Another estimation method is based on differentiators that can be obtained by difference method or LS method. For example, the frequency estimation can be expressed as:

$$f(k) = \frac{1}{2\pi}\sum_{i=0}^{2N_d} d(i)\varphi(i - N_d + k) + f_n \qquad (6)$$

where d(i) is the differentiator coefficients, φ(i) is the estimated phase angle, and $2N_d$ is the differentiator order.

The differentiator can be regarded as a FIR filter. Its filtering characteristics affect the design of the complex band-pass filter h(k). In an example embodiment, the differentiator can be used to estimate the frequency and ROCOF, and its influence on the parameter range of h(k) may be analyzed.

Framework for a Design Method

FIG. 1 shows an example framework for a design method for phasor estimation based on complex band-pass filters. In one example embodiment, based on the measurement requirements of applications and standards, the range of filter parameters can be determined by mathematical error models. The complex band-pass filter is designed to estimate the synchrophasor based on the obtained filter parameter range after checking the response time and latency.

In one example embodiment, in step 1, the measurement requirements can be obtained. Different application scenarios have different requirements that include reporting rate, measurement bandwidth, and error limitations under static and dynamic conditions. For example, M-class and P-class PMU have different measurement bandwidths, which are 45 Hz-55 Hz and 48 Hz-52 Hz, respectively. Before designing a phasor algorithm, these requirements must be determined in advance.

In one example embodiment, in step 2, the filter parameter range may be calculated. To design a complex band-pass filter, one has to determine its parameters. The main filter parameters include the passband range, passband gain, stopband range, and stopband gain. For different classes of PMUs, the range of the passband and stopband can be obtained directly by the measurement bandwidth requirement of different scenarios and reporting rate. The gain range of the passband and stopband can be determined by error limitations. Thus, error models between the filter gain and error limitations are analyzed, which determine the filter gain range.

In step 3, the filter can be designed. Based on the range of filter parameters, the complex band-pass filter can be designed using any of the following techniques. For example, the WLS algorithm, iterative reweighting WLS (IRWLS) algorithm, or other similar algorithms may be used to design the complex band-pass filter. As another example, real low-pass filters are designed first, and subsequently, complex band-pass filters are obtained using the DFT method.

In one example embodiment, the second design method can be used in phasor estimation, such as the method recommended in IEEE standard. In another example embodiment, the first method is the optimal design method and can customize the gain at different frequency bands. In addition, the first method may have better filtering characteristics than the second method under the same filter order. Therefore, the IRWLS algorithm in the first method may be applied to design the complex band-pass filter.

In one example embodiment, in step 4, the response time and reporting latency may be checked. After designing a complex band-pass filter, it is necessary to check whether its time response and latency depending on data window meet the application requirements. If not, the complex band-pass filter may be redesigned after adjusting related requirements.

In Step 2, although the range of passband and stopband can be determined by the reporting rate and the measurement bandwidth of different applications, it may be challenging to determine the range of passband and stopband gain. Therefore, establishing the error models between the error limits and filter gain ranges is an important aspect of this disclosure.

The current filter design criteria have various shortcomings. For example, the influence of amplitude and phase error limitations on the gain range is not analyzed. Additionally, the criteria neglect the influence of the frequency and ROCOF estimation method based on differentiator on the gain range. Moreover, the influence of multiple interferences (e.g. negative fundamental component and OOB interharmonic) on the stopband gain range is not considered. To address these problems, this disclosure provides for general error models between the gain range and error limitations.

In the described framework, because the filter parameter range has been determined by error models, the designed h(k) can be used for phasor estimation directly as long as it meets the requirements of response time and reporting latency. However, if the filter parameter range is not determined first, complete static and dynamic tests are required to verify whether the measurement performance of the designed filter meets the requirements. If not, the filter needs to be redesigned. The design process of phasor algorithms is tedious and time-consuming. Therefore, the proposed error models can facilitate the design of the complex band-pass filter and reduce trial and error.

General Error Models

Two inequalities will be used in the following analysis:

Inequality 1: Any two numbers a and b have the following inequality relations:

$$||a|-|b|| \leq |a \pm b| \leq |a|+|b| \qquad (7)$$

Inequality 2: For any real number θ, the arctangent function has the following relations:

$$|\arctan \theta| = \arctan|\theta| \leq |\theta| \qquad (8)$$

In addition, if |θ|≤2°, |θ−arctan θ|≤0.00082°. Thus, if θ is small, arctan θ≈θ.

Figure 2:
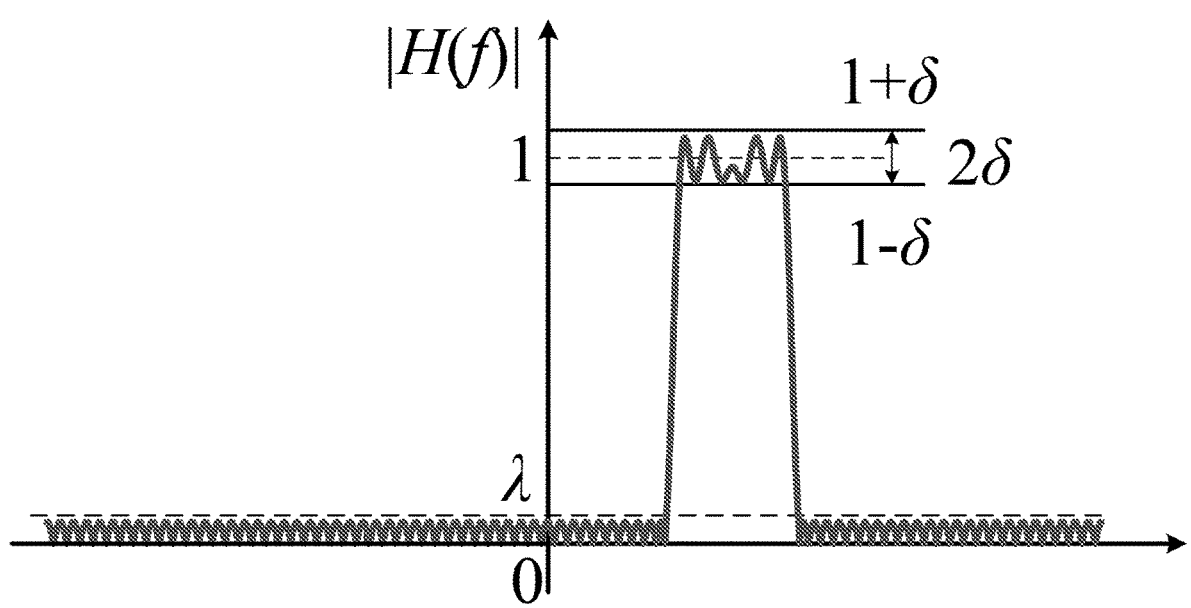
FIG. 2 shows an example diagram of phasor estimation filters designed by IRWLS algorithm.

FIG. 2 shows an example diagram of phasor estimation filters designed by IRWLS algorithm. In this example embodiment, |H(f)| represents the magnitude response of h(k), δ is the passband ripple, indicating that the passband gain fluctuates between 1−δ and 1+δ, and the stopband gain is less than λ. In this section, the task is to establish the error models between the filter gain and application requirements. Based on the models, the maximum values of δ and λ can be obtained to set up criteria for the design of h(k).

When using h(k) to measure the phasor, the estimation error may fulfill the following equation:

$$E = |E(\delta) + E(\lambda)| \leq E_{lim} \qquad (9)$$

where E is the estimation error, E(δ) is the error caused by the ripple δ, E(λ) is the error resulting from the interference components that are not fully suppressed, and $E_{lim}$ is the error limitation from the standards or application requirements. There is a coupling relationship between the errors caused by δ and λ. In such case, it is difficult to analyze the range of δ and λ. However, according to Inequality 1, the errors caused by δ and λ can be obtained by:

$$E \leq |E(\delta)| + |E(\lambda)| \leq E_{lim} \quad (10)$$

where the errors caused by δ and λ are independent of each other. Thus, the analysis of the passband ripple δ is not involved in the stopband gain 2, and vice versa. To meet the requirements, E(δ) and E(λ) must satisfy the following equation:

$$|E(\delta)| \leq E_{pass}, \ |E(\lambda)| \leq E_{stop}, \ E_{pass} + E_{stop} \leq E_{lim} \quad (11)$$

where $E_{pass}$ and $E_{stop}$ are the given limitations of errors caused by δ and λ, and their sum must be smaller than $E_{lim}$. In practical applications, hardware uncertainty and random noise may exist. To meet the requirements, $E_{pass}$ and $E_{stop}$ must have a certain margin. Static signals have more accuracy requirements and are more sensitive to random noise. Therefore, in one example embodiment, $E_{pass} = E_{stop} = E_{lim}/10$ for static conditions and $E_{pass} = E_{stop} = E_{lim}/3$ for dynamic conditions. Other error limitation distributions satisfying (11) are also allowed. Therefore, the range of the passband and stopband gain can be analyzed separately.

Based on (11), we want to use general error models to obtain the gain range:

$$\delta \leq S_1(E_{pass}), \ \lambda \leq S_2(E_{stop}) \quad (12)$$

where $S_1(\bullet)$ and $S_2(\bullet)$ are the functions with $E_{pass}$ and $E_{stop}$, respectively. Equation (12) indicates that the range of δ and λ can be determined as long as the error limitations of the passband and stopband are given.

There are three kinds of errors for the application requirements, namely phasor error, FE, and RFE. In IEEE standards, TVE is used to evaluate the phasor accuracy. However, AE and PE are used to evaluate the phasor accuracy in some standards, such as Chinese PMU standards. Thus, to make error models more general, there are five kinds of error limitations: $TVE_{pass}$ ($TVE_{stop}$), $AE_{pass}$ ($AE_{stop}$), $PE_{pass}$ ($PE_{stop}$), $FE_{pass}$ ($FE_{stop}$), and $RFE_{pass}$ ($RFE_{stop}$). The range of δ and λ is analyzed based on these error limitations.

A. Error Models for Passband Gain

The ideal passband gain is one, but in practical applications the passband gain of h(k) has fluctuation and attenuation. Therefore, δ needs to be limited to ensure the phasor accuracy. Due to the length limitation, the PM signal, which is the most complex scenario, is taken as an example to deduce the general error models and the range of δ.

When the phase angle is sinusoidally modulated, the power signal model can be modelled as follows:

$$x(t) = \sqrt{2} X_m \cos[2\pi f_0 t + k_p \sin(2\pi f_m t + \varphi_m) + \varphi_0] \quad (13)$$

where $X_m$, $f_0$ and $\varphi_0$ are the amplitude, frequency, and initial phase of the fundamental signal, respectively; $k_a$, $f_m$ and $\varphi_m$ are the phase modulation depth, frequency and initial phase, respectively. According to the Bessel function, the above equation can be decomposed as follows:

$$x(t) = \sqrt{2} X_m \sum_{n=-\infty}^{\infty} J_n(k_p)(-1)^n \cos[2\pi(f_0 + nf_m)t + \varphi_0 + n\varphi_m] \quad (14)$$

where $J_n(\bullet)$ is the first Bessel function of n order.

The $f_0$ and $f_0 \pm f_m$ components are in the passband of h(k) and their estimation errors are denoted as $\Delta E_1$. In addition, the $f_0 \pm 2f_m$, $f_0 \pm 3f_m$ and other components also affect the estimation accuracy. When the reporting rate is small and the modulation frequency is large (e.g., =25 Hz and $f_m$=5 Hz), the phasor estimation methods may suppress these frequency components due to its narrow passband for effectively reducing OOB inter-harmonics. This may cause an error of $\Delta E_2$, which is not considered in other methods.

The worst case is that other components are completely filtered out, and only $f_0$ and $f_0 \pm f_m$ remained. In this case, $|\Delta E_2|$ is the largest and the acceptable $\Delta |E_1|$ is the smallest according to (15). Once δ can meet the requirements under this scenario, it is also suitable for other $F_r$ and $f_m$ values. Therefore, the following analysis focuses on this most stringent case.

$$E(\delta) = |\Delta E_1 + \Delta E_2| \leq |\Delta E_1| + |\Delta E_2| \leq E_{pass} \quad (15)$$

When there are only the three components $f_0$ and $f_0 \pm f_m$, the extracted phasor can be represented as follows:

$$z(t) = X_m[J_0(k_p)|H(f_0)|e^{j2\pi f_0 t} + J_1(k_p)|H(f_0+f_m)|e^{j2\pi(f_0+f_m)t} - \quad (16)$$
$$J_1(k_p)|H(f_0-f_m)|e^{j2\pi(f_0-f_m)t}]$$
$$= X_m e^{j2\pi f_0 t}(k_{p0} + k_{p1}e^{j2\pi f_m t} - k_{p2}e^{-j2\pi f_m t}) = X_m e^{j2\pi f_0 t}\Delta z(t)$$

where the initial phase is set as zero for convenience of the derivative, and additionally $k_{p0}=J_0(k_p)|H(f_0)|$, $k_{p1}=J_1(k_p)|H(f_0+f_m)|$, and $k_{p2}=J_1(k_p)|H(f_0-f_m)|$. The $f_0$ may not be the nominal frequency. If the frequency-tracking technique is applied, $k_{p1}$ may be equal to $k_{p2}$. But for fixed filters, $k_{p1} \neq k_{p2}$, which is more general. If the error models for $k_{p1} \neq k_{p2}$ is established, those may be also suitable for $k_{p1} = k_{p2}$. Therefore, $k_{p1} \neq k_{p2}$ is considered in the following analysis, which is not involved in the existing filter design criteria.

The theoretical phasor is:

$$X^+(t) = X_m e^{j(2\pi f_0 t + k_p \sin 2\pi f_m t)} \quad (17)$$

i. Phasor Error Limitation

As mentioned above, different standards have different evaluation criteria for phasor accuracy. TVE, AE, and PE are commonly used.

a) Amplitude Error Limitation

The amplitude error is $$AE = ||X^+(t)| - |z(t)||/|X^+(t)| = |1 - |\Delta z(t)|| \quad (18)$$

Let $k_{p2} = k_{p1} + \Delta k_{p2}$, and then $$\Delta z(t) = k_{p0} + k_{p1}e^{j2\pi f_m t} - k_{p2}e^{-j2\pi f_m t} \quad (19)$$
$$= k_{p0} + k_{p1}e^{j2\pi f_m t} - (k_{p1} + \Delta k_{p2})e^{-j2\pi f_m t}$$
$$= k_{p0} + j2k_{p1}\sin 2\pi f_m t - \Delta k_{p2}e^{-j2\pi f_m t}$$

After analysis on (19), the range of $|\Delta z(i)|$ is:

$$k_{p0} - |\Delta k_{p2}| \leq |\Delta z(t)| \leq \sqrt{k_{p0}^2 + 4k_{p1}^2} + |\Delta k_{p2}| \quad (20)$$

Thus, the range of AE has two cases:

$$AE \leq |1 - k_{p0} + |\Delta k_{p2}|| \leq |1 - k_{p0}| + |\Delta k_{p2}| \quad (21)$$

or $$AE \leq |1 - \sqrt{k_{p0}^2 + 4k_{p1}^2} - |\Delta k_{p2}|| = \sqrt{k_{p0}^2 + 4k_{p1}^2} + |\Delta k_{p2}| - 1 \quad (22)$$

The range of the passband gain is between $1-\delta$ and $1+\delta$. Thus, the range of $k_{p0}$ is between $J_0(k_p)(1-\delta)$ and $J_0(k_p)(1-\delta)$, and the range of $k_{p1}$ and $k_{p2}$ is between $J_1(k_p)(1-\delta)$ and $J_1(k_p)(1-\delta)$. After analysis on (21) and (22), the maximum value of AE is:

$$AE \le 1-(1-\delta)J_0(k_p)+2\delta \cdot J_1(k_p) \le AE_{pass} \quad (23)$$

or $$AE = \sqrt{J_0(k_p)^2 + 4J_1(k_p)^2} \cdot (1+\delta) + 2\delta \cdot J_1(k_p) - 1 \le AE_{pass} \quad (24)$$

Then, the range of the ripple $\delta$ can be obtained:

$$\delta \le (AE_{pass} - 1 + J_0(k_p))/(J_0(k_p) + 2J_1(k_p)) \quad (25)$$

or $$\delta \le \frac{AE_{pass} + 1 - \sqrt{J_0(k_p)^2 + 4J_1(k_p)^2}}{\sqrt{J_0(k_p)^2 + 4J_1(k_p)^2} + 2J_1(k_p)} \quad (26)$$

$\delta$ must be set as the minimum range of (25) and (26).

b) Phase Error Limitation

Since $|\Delta k_{p2}| \ll \sqrt{k_{p0}^2 + 4k_{p1}^2 \sin^2 2\pi f_m t}$ in $\Delta z(t)$, the phase angle can be approximated as (using Inequality 2)

$$\angle \Delta z(t) \approx \angle(k_{p0} + j2k_{p1}\sin 2\pi f_m t) = \arctan(2k_{p1}\sin 2\pi f_m t / k_{p0}) \quad (27)$$
$$\approx (2k_{p1}/k_{p0})\sin 2\pi f_m t$$

The phase error is then:

$$PE = |\angle X^+(t) - \angle z(t)| \approx |(k_p - 2k_{p1}/k_{p0})\sin 2\pi f_m t| \le \quad (28)$$
$$\left| k_p - \frac{2k_{p1}}{k_{p0}} \right| \le \left| k_p - \frac{J_1(k_p)(2+2\delta)}{J_0(k_p)(1-\delta)} \right| \le PE_{pass}$$

Therefore, the ripple $\delta$ has the following range:

$$\delta \le \frac{(PE_{pass}+k_p)J_0(k_p) - 2J_1(k_p)}{(PE_{pass}+k_p)J_0(k_p) + 2J_1(k_p)} \quad (29)$$

c) TVE Limitation

Similar to the above analysis, the range of $\delta$ under TVE limitation is given directly:

$$\delta \le (TVE_{pass} - TVE_2)/(K_0(k_p) + 2J_1(k_p)) \quad (30)$$

where $TVE_2$ is independent of the passband gain and depends on $f_0 \pm 2f_m$, $f_0 \pm 3f_m$ and other components, and it can be calculated by simulation.

ii. Frequency Error Limitation

According to (28), the frequency error can be obtained by:

$$FE = \frac{1}{2\pi} \cdot \frac{d(PE)}{dt} \approx \frac{1}{2\pi} |(k_p - 2k_{p1}/k_{p0}) 2\pi f_m \cos 2\pi f_m t| \quad (31)$$

In practical applications, the numerical differentiation is used to replace the derivative. In this disclosure, the differentiator is used to estimate the frequency, and its magnitude response is denoted as D(f). Therefore, the derivative of $\sin(2\pi f_m t)$ must be $D(f_m) \cdot \cos(2\pi f_m t)$, instead of $(2\pi f_m) \cdot \cos(2\pi f_m t)$. The above equation must be modified as:

$$FE = \frac{1}{2\pi} |(k_p - 2k_{p1}/k_{p0})D(f_m)\cos 2\pi f_m t| \le PE \cdot D(f_m)/2\pi \le FE_{pass} \quad (32)$$

Then, the range of $\delta$ is:

$$\delta \le \frac{(2\pi \cdot FE_{pass}/D(f_m)+k_p) \cdot J_0(k_p) - 2J_1(k_p)}{(2\pi \cdot FE_{pass}/D(f_m)+k_p) \cdot J_0(k_p) - 2J_1(k_p)} \quad (33)$$

iii. ROCOF Error Limitation

Like the frequency estimation, the ROCOF error is:

$$RFE = \frac{1}{2\pi} \cdot \frac{d^2(PE)}{dt^2} \le \frac{1}{2\pi} PE \cdot R(f_m) \le RFE_{pass} \quad (34)$$

where R(f) is the magnitude response of the differentiator to estimate the ROCOF. Thus, the ripple $\delta$ must meet:

$$\delta \le \frac{(2\pi \cdot RFE_{pass}/R(f_m)+k_p) \cdot J_0(k_p) - 2J_1(k_p)}{(2\pi \cdot RFE_{pass}/R(f_m)+k_p) \cdot J_0(k_p) - 2J_1(k_p)} \quad (35)$$

The analysis process for the error models of other signal types includes the same steps as those from 1) to 3), and thus no additional details are given.

B. Error Models for Stopband Gain

The stopband of h(k) is used to suppress interference signals, including XV), harmonics and OOB inter-harmonics. The existing design criteria has paid no attention to the influence of the negative fundamental component.

i. Error Models for the Negative Fundamental Component

When there is no OOB and harmonic in the signal, only $X^-(t)$ needs to be rejected. In this case, the extracted phasor is:

$$z(t) = X_m e^{j2\pi f_0 t} + |H(-f_0)| X_m e^{-j2\pi f_0 t} \quad (36)$$

For the sake of generality, the above equation is rewritten as:

$$z(t) = X_m e^{j2\pi f_0 t} + |H(f_i)|k_i X_m e^{j2\pi f_i t} \quad (37)$$
$$= X_m e^{j2\pi f_0 t}(1 + |H(f_i)|k_i e^{j2\pi(f_i - f_0)t})$$

where $f_i$ is the frequency of one interference signal, $k_i$ is the ratio of the magnitude of the interference signal to the fundamental magnitude. In particular, if $f_i = -f_0$, then $k_i = 1$. Let $G_i = |H(f_i)| \cdot k_i$ and $p_i = 2\pi(f_i - f_0)$, then $$\Delta z(t) = 1 + |h(f_i)|k_i e^{j2\pi(f_i - f_0)t} = 1 G_i + \cos p_i t + jG_i \sin p_i t \quad (38)$$

a) Phasor Error Limitation (1) Amplitude Error Limitation

The amplitude error is:

$$AE = \frac{\|X^+(t)\| - |z(t)\|}{|X^+(t)|} = \frac{\left| X_m - X_m\sqrt{1 + 2G_i \cos p_i t + G_i^2} \right|}{X_m} \quad (39)$$

-continued $$= \left|1 - \sqrt{1 + 2G_i\cos p_i t + G_i^2}\right| \le G_i \le AE_{stop}$$

Thus, the stopband gain can be obtained as follows:

$$|H(f_i)| \le AE_{stop}/k_i \quad (40)$$

(2) Phase Error Limitation

PE is (the maximum value is taken when $\cos(p_i t)=-G_i$)

$$PE = |\angle \Delta z(t)| = \left|\arctan\frac{G_i \sin p_i t}{1 + G_i \cos p_i t}\right| \le \arctan\frac{G_i}{\sqrt{1-G_i^2}} \le PE_{stop} \quad (41)$$

Thus, the stopband gain must satisfy:

$$|H(f_i)| \le \frac{1}{k_i}\frac{\tan PE_{stop}}{\sqrt{1+\tan^2 PE_{stop}}} \quad (42)$$

(3) TVE Limitation

The phasor error is:

$$TVE = |X^+(t)-z(t)|/|X^+(t)| = G_i \le TVE_{stop} \quad (43)$$

Thus, the stopband gain has the following range:

$$|H(f_i)| \le TVE_{stop}/k_i \quad (44)$$

b) Frequency Error Limitation

The frequency error is:

$$FE = \frac{1}{2\pi}\left|\frac{d\angle\Delta z(t)}{dt}\right| = \left|\frac{G_i p_i \cos p_i t + G_i^2 p_i}{1 + 2G_i \cos p_i t + G_i^2}\right| \quad (45)$$

In practical applications, the numerical differentiation is used to replace the derivation. The differentiator is used to estimate the frequency and ROCOF, and its magnitude response is denoted as D(f). Therefore, the derivative expression of $\sin(p_i t)$ must be $D(f_i-f_0)\cdot\cos(p_i t)$ instead of $p_i\cdot\cos(p_i t)$. The above equation must be rewritten as:

$$FE = \frac{1}{2\pi}\left|\frac{G_i D(f_i-f_0)\cos p_i t + G_i^2 D(f_i-f_0)}{1+2G_i\cos p_i t + G_i^2}\right| \quad (46)$$

$$\le \frac{1}{2\pi}\left|\frac{G_i D(f_i-f_0)}{1+G_i}\right| \le FE_{stop}$$

Therefore, the range of the stopband gain is:

$$|H(f_i)| \le \frac{1}{k_i}\frac{2\pi\cdot FE_{stop}/D(f_i-f_0)}{1+2\pi\cdot FE_{stop}/D(f_i-f_0)} \quad (47)$$

c) ROCOF Error Limitation

The analysis process is the same as the above b), and it is not discussed in detail here. For the given ROCOF error limitation, the range of the stopband gain can be obtained as:

$$|H(f_i)| \le \frac{1}{k_i}\frac{2\pi\cdot RFE_{stop}/R(f_i-f_0)}{\sqrt{1+(2\pi\cdot RFE_{stop}/R(f_i-f_0))^2}} \quad (48)$$

ii. Error Models for OOB or Harmonic

When there is a single harmonic or OOB inter-harmonic in the power signal, its positive and negative components exist in the frequency domain according to Euler's formula. In addition, $X^-(t)$ is also included in the power signal. This means that three interference components need to be rejected at the same time. On this condition, the phasor obtained is as follows:

$$z(t) = X_m e^{j2\pi f_0 t} + |H(-f_0)|X_m e^{-j2\pi f_0 t} + \quad (49)$$

$$|H(f_i)|k_i X_m e^{j2\pi f_i t} + |H(-f_i)|k_i X_m e^{-j2\pi f_i t}$$

$$= [X_m e^{j2\pi f_0 t} + |H(-f_0)|X_m e^{-j2\pi f_0 t}] +$$

$$[X_m e^{j2\pi f_0 t} + |H(f_i)|k_i X_m e^{j2\pi f_i t}] -$$

$$[X_m e^{j2\pi f_0 t} - |H(-f_i)|k_i X_m e^{-j2\pi f_i t}]$$

$$= z_1(t) + z_2(t) - z_3(t)$$

The theoretical phasor is:

$$X^+(t) = X_m e^{j2\pi f_0 t} = X_m e^{j2\pi f_0 t} + X_m e^{j2\pi f_0 t} - X_m e^{j2\pi f_0 t} \quad (50)$$

$$= X_1^+(t) + X_2^+(t) - X_3^+(t)$$

$E(X^+(t), z(t))$ is denoted as the estimation error between $X^+(t)$ and $z(t)$, and thus the overall error is:

$$E(\lambda) = |E(X_1^+(t), z_1(t)) + E(X_2^+(t), z_2(t)) - E(X_3^+(t), z_3(t))| \le \quad (51)$$

$$|E(X_1^+(t), z_1(t))| + |E(X_2^+(t), z_2(t))| + |E(X_3^+(t), z_3(t))| \le E_{stop}$$

The estimation error of multiple components is smaller than the sum of the errors of each component. The error analysis of multiple components is transformed into that of a single component. To meet the requirements, the error limitations of each part is set as $E_{stop}/3$. The detailed analysis is the same as that described in the above subsection, and is not discussed here.

C. Design Procedure for Phasor Estimation Method

In one example embodiment, the phasor estimation methods of different classes of PMUs can be designed as follows:

First, the measurement passband range, stopband range, and error limitations are determined according to different standards or application requirements. Second, the range of the passband and stopband gain is obtained by substituting the error limitations into the error models, such as (29), (30), (33), (42), (44), and (47). Different signal types may have different δ and λ, and then the minimum values of all obtained δ and λ are selected as the final gain range.

Third, according to the above parameters, the IRWLS algorithm is used to design the complex band-pass filter.

Fourth, based on the above analysis, the phasor estimation filter h(k) can be used to develop the phasor algorithm, and then the synchrophasor can be estimated.

Case Study

A. Design of Different Classes of Phasor Estimation Methods

According to the above procedure, different classes of phasor estimation methods (M-class, P-class, and S-class) can be designed.

Figure 3:
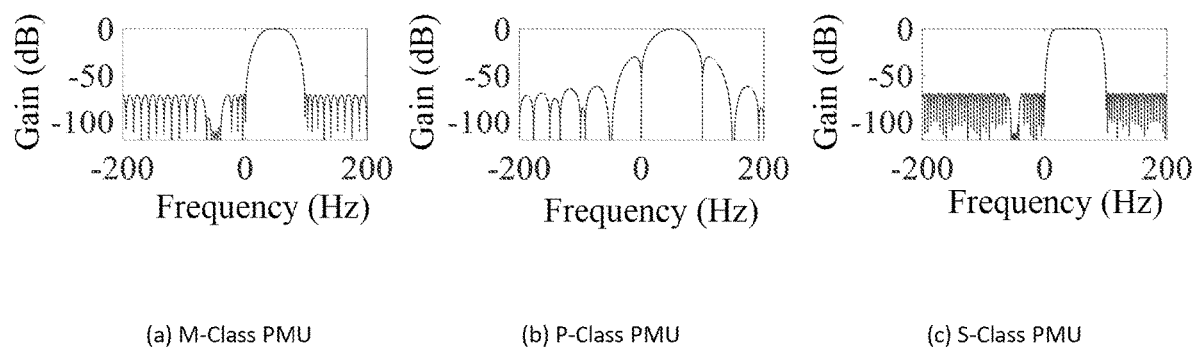
FIG. 3 shows example filtering characteristics and parameter ranges for M-class, P-class, and S-class filters.

FIG. 3 shows example filtering characteristics and parameter ranges for M-class, P-class, and S-class filters. Additionally, Table I shows example filtering characteristics and parameter ranges for M-class, P-class, and S-class filters. The S-class PMU is proposed to monitor the SSO in real-time, because of the SSO affecting the stability of the power systems. When SSOs occur in the power systems, the power signals may have high-frequency oscillations of up to 30 Hz or higher. However, M-class PMUs focus on estimating the power signals with an oscillation frequency of less than 5 Hz. Therefore, a phasor estimation method for the S-class PMU is described to measure the phasor oscillations at high frequency.

During the design process, the reporting rates of the M- and S-class PMUs are 100 Hz, so it is necessary to filter out the OOB interference signals over 100 Hz. For the P-class PMU, its stopband only needs to filter out the harmonic signals and does not need to have the suppression ability of the OOB signals. The algorithm of the S-class PMU is designed to monitor SSO of 30 Hz, so the passband range is 20-80 Hz. The passband range and error limitations of the M-class and P-class PMU are known. There are no standards for the S-class PMU, so the error limitations of the M-class PMU are used to determine the gain range of the S-class PMU in this disclosure.

The "Required" in Table I means that the gain ranges of passband and stopband are calculated according to the described general error model. The "Designed" is the real gains of the designed filters. According to the above analysis, the magnitude of the negative fundamental component $X^-(X)$ is more than that of the harmonic and OOB interharmonic. Thus, the gain range of $X^-(t)$ is less than that of other stopbands. The "Designed" gains are in the range of the "required" gains, and thus the estimation accuracy of the phasor methods can meet the standard and application requirements.

The step response and reporting latency of the designed algorithms have been checked, and they meet the standard requirements. Therefore, different classes of methods can be used for the phasor estimation in different application scenarios.

TABLE I

MEASUREMENT REQUIREMENTS AND FILTER PARAMETER RANGE OF DIFFERENT CLASSES OF PHASOR ESTIMATION METHODS

| | | | M-class | P-class | S-class |
|---|---|---|---|---|---|
| | Passband range | | 45-55 Hz | 48-52 Hz | 30-80 Hz |
| | Stopband range | | ≥100 Hz | Harmonic | ≥100 Hz |
| Passband | Required (dB) | | <0.0087 | 0.059 | <0.0087 |
| ripple | Designed (dB) | | 0.007 | 0.035 | 0.005 |
| Stopband | $X^-(t)$ | Required (dB) | <−89 | <−79 | <−89 |
| gain | | Designed (dB) | −112 | −110 | −115 |
| | Harmonic/ | Required (dB) | <−67.6 | <−59 | <−67.6 |
| | OOB | Designed (dB) | −69 | −100 | −68 |
| Data window (cycles) | | | 4 | 2 | 10 |

TABLE II

MAXIMUM ERRORS OF M-CLASS PMUS UNDER STEADY-STATE AND DYNAMIC CONDITIONS

| | TVE (%) | | | | FE (Hz) | | | | RFE (Hz/s) | | | |
|---|---|---|---|---|---|---|---|---|---|---|---|---|
| Test types | Std | $M_A$ | $M_B$ | $M_C$ | Std | $M_A$ | $M_B$ | $M_C$ | Std | $M_A$ | $M_B$ | $M_C$ |
| Off-nominal | 1 | 0.003 | 0.003 | 0.133 | 0.005 | $1.2 \times 10^{-4}$ | 0.008 | 0.012 | 0.1 | 0.007 | 0.004 | 0.689 |
| Harmonics/OOB | 1 | 0.010 | 0.065 | 0.137 | 0.025 | $1.9 \times 10^{-4}$ | 0.003 | 0.004 | — | 0.033 | 0.127 | 0.216 |
| AM | 3 | 0.011 | 1.104 | 0.759 | 0.01 | $3.7 \times 10^{-4}$ | 0.008 | 0.008 | 14 | 0.014 | 0.203 | 0.209 |
| PM | 3 | 0.015 | 0.998 | 0.688 | 0.3 | 0.009 | 0.031 | 0.040 | 14 | 0.523 | 1.190 | 1.470 |
| Frequency ramp | 1 | 0.011 | 0.058 | 0.211 | 0.01 | $1.3 \times 10^{-4}$ | 0.009 | 0.012 | 0.2 | 0.012 | 0.007 | 0.677 |

TABLE III

RESPONSE TIME FOR M-CLASS PMUS

| Step types | Phasor (ms) | | | | Frequency (ms) | | | | ROCOF (ms) | | | |
|---|---|---|---|---|---|---|---|---|---|---|---|---|
| | Std | $M_A$ | $M_B$ | $M_C$ | Std | $M_A$ | $M_B$ | $M_C$ | Std | $M_A$ | $M_B$ | $M_C$ |
| Amplitude step | 140 | 21 | 40 | 32 | 280 | 75 | 62 | 69 | 280 | 106 | 86 | 94 |
| Phase step | 140 | 21 | 46 | 37 | 280 | 87 | 64 | 73 | 280 | 111 | 87 | 112 |

B. Experimental Tests

The three phasor estimation methods were implemented in the PMU prototype. The hardware framework of the PMU prototype and its explained below.

i. M-Class PMU

The test conditions for the M-class PMUs under static and dynamic conditions are explained in IEEE and Chinese PMU standards. It should be noted that the fundamental frequency offsets ±0.5 Hz in the harmonic, OOB, AM, and PM tests. The measurement accuracy of the proposed M-class phasor algorithm ($M_A$) is compared with that of the iterative-Interpolated DFT (i-IpDFT) algorithm ($M_B$) and the algorithm recommended in IEEE Std. ($M_C$). For the sake of comparison, the data windows are all 4 cycles. The test results are shown in Tables II and III.

As shown in Table II, the described method $M_A$ suppresses $X^-(t)$; thus, the accuracy is high in the off-nominal test. The $M_B$ method suppresses $X^-(t)$ using an iterative technique, resulting in high accuracy as well. However, the $M_C$ method does not suppress $X^-(t)$ effectively, causing larger estimation errors. $M_A$ provides good suppression performance for harmonics and OOB inter-harmonics based on the error models. The iterative technique in $M_B$ is used to reduce the influence of interferences, but the accuracy is lower than that of $M_A$. Compared with $M_A$, the $M_C$ method is not optimal and it exhibits poor performance for interference suppression. Under dynamic conditions, the passband ripple of $M_A$ is small and $X^+(t)$ can be extracted accurately. However, $M_B$ and $M_C$ do not have the flat-top passband gain and their errors are larger than that of $M_A$. The accuracy of $M_A$ is at least one order of magnitude better than the standard requirements under static and dynamic conditions.

As shown in Table III, the proposed method $M_A$ has the shortest phasor response time in the same data window. The data window of the frequency and ROCOF estimation for $M_B$ is one cycle less than those of $M_A$ and $M_C$; therefore, the frequency and ROCOF response time are the shortest. However, the response time of $M_A$ is within the limitations.

ii. P-Class PMU

The test conditions are known in the art. The fundamental frequency also offsets ±0.5 Hz in the harmonic, AM, and PM tests, and the harmonic magnitude is 10% of the fundamental magnitude. The P-class algorithm in IEEE Std. ($P_B$) and the AM model method ($P_C$) are compared with the proposed method ($P_A$). In addition, a correction method is applied to improve the accuracy of $P_A$, because of the larger passband attenuation. The maximum errors and response times are shown in Tables IV and V.

As listed in Table IV, $P_C$ provides accurate estimates for signals without any interference, but the errors are too large to meet the limitations in harmonic tests. Many harmonics may occur in actual power systems, especially in the renewable energy field. Thus, $P_C$ may be difficult to provide accurate phasors if it is not improved. The accuracies of $P_A$ and $P_B$ meet the requirements in all tests. In the off-nominal and frequency ramp tests, $P_B$ exhibits less suppression of $X^-(t)$ than $P_A$; thus, the phasor errors are larger. Because the designed $P_A$ successfully filters out the harmonics, the measurements are accurate, even for a 10% harmonic content. The correction technique in IEEE Std. is only suitable for the frequency offset but not for dynamic modulation. However, the proposed correction method is applicable to both conditions. Hence, the phasor errors of $P_B$ are higher than those of $P_A$ in the AM and PM tests. In the step tests (Table V), the three methods exhibit small differences in the frequency and ROCOF response time. However, the phasor response time of $P_A$ is shortest due to the use of the proposed correction method. To sum up, the described method has good performance under static and dynamic conditions, and its accuracy is at least 10 times better than the requirements.

TABLE IV

MAKuvium ERRORS OF P-CLASc PMUS UNDER STEADY-STATE AND DYNAMIC CONDITIONS

| Test types | TVE (%) | | | | FE (Hz) | | | | RFE (Hz/s) | | | |
|---|---|---|---|---|---|---|---|---|---|---|---|---|
| | Std | $P_A$ | $P_B$ | $P_C$ | Std | $P_A$ | $P_B$ | $P_C$ | Std | $P_A$ | $P_B$ | $P_C$ |
| Off-nominal | 1 | 0.005 | 0.044 | 0.004 | 0.005 | $1.2 \times 10^{-4}$ | 0.002 | $2.2 \times 10^{-4}$ | 0.4 | 0.009 | 0.057 | 0.095 |
| Harmonics | 1 | 0.005 | 0.014 | 3.151 | 0.005 | $1.0 \times 10^{-4}$ | $1.5 \times 10^{-4}$ | 0.025 | 0.4 | 0.005 | 0.011 | 142 |
| AM | 3 | 0.006 | 0.059 | 0.0011 | 0.06 | $5.9 \times 10^{-4}$ | $7.4 \times 10^{-4}$ | $3.2 \times 10^{-4}$ | 2.3 | 0.014 | 0.032 | 0.154 |
| PM | 3 | 0.006 | 0.064 | 0.009 | 0.06 | 0.002 | 0.002 | $7.4 \times 10^{-4}$ | 2.3 | 0.025 | 0.039 | 0.146 |
| Frequency ramp | 1 | 0.007 | 0.053 | 0.013 | 0.01 | $1.9 \times 10^{-4}$ | 0.002 | $2.6 \times 10^{-4}$ | 0.4 | 0,013 | 0.044 | 0.112 |

TABLE V

RESPONSE TIME FOR P-CLASS PMUS

| Step types | Phasor (ms) | | | | Frequency (ms) | | | | ROCOF (ms) | | | |
|---|---|---|---|---|---|---|---|---|---|---|---|---|
| | Std | $P_A$ | $P_B$ | $P_C$ | Std | $P_A$ | $P_B$ | $P_C$ | Std | $P_A$ | $P_B$ | $P_C$ |
| Amplitude step | 40 | 15 | 23 | 18 | 90 | 51 | 53 | 60 | 120 | 58 | 56 | 60 |
| Phase step | 40 | 19 | 28 | 33 | 90 | 56 | 58 | 59 | 120 | 59 | 58 | 60 | iii. S-Class PMU

No requirements are specified for S-class PMUs in existing PMU standards. The S-class PMU focuses on the phasor extraction of high-frequency oscillation signals. Therefore, the following tests are used to evaluate the performance of the S-class PMU.

a) Modulation Tests

The power signals during SSOs are modulated at high frequency. Thus, AM and PM signals with high modulation frequency are used to test the accuracy of the designed phasor algorithm. Under actual field conditions, the harmonics and OOB inter-harmonics may be superimposed onto the SSO signals, which may interfere with the monitoring of SSOs. In addition, the fundamental frequency may deviate from 50 Hz. Therefore, the AM or PM test signals contain the harmonics of 100 Hz and 150 Hz and the OOB inter-harmonics of 110 Hz and 130 Hz. The magnitudes of these interferences are 10% of the fundamental magnitude and the fundamental frequency offsets ±1 Hz.

Figure 4:
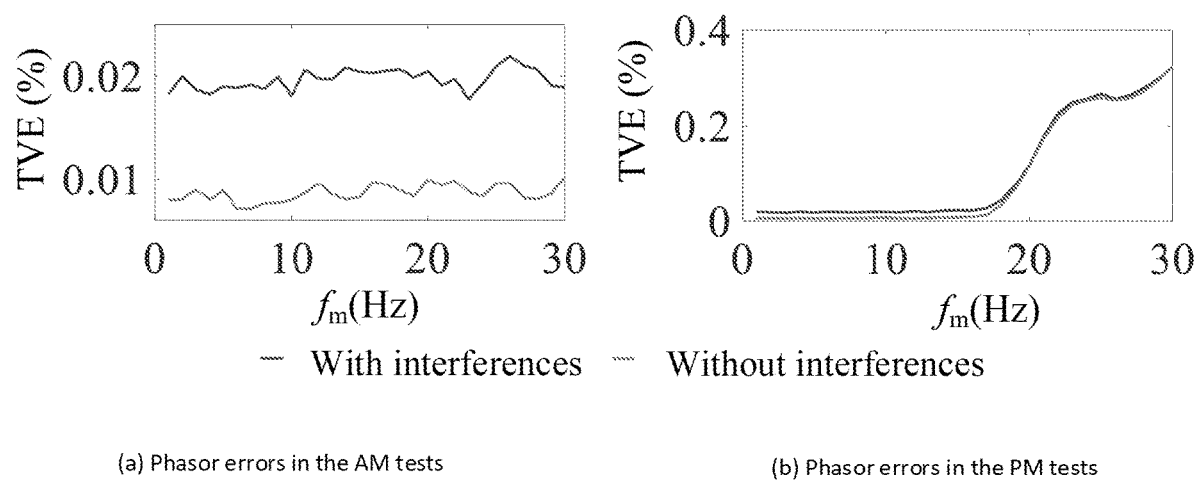
FIG. 4 displays the phasor errors of an example S-class PMU in the AM and PM tests.

FIG. 4 displays the phasor errors of an example S-class PMU in the AM and PM tests. The blue curve (i.e., the curve on the top) shows the phasor errors of the test signals with the interferences and the red curve (i.e., the curve on the bottom) denotes the phasor errors of the interference-free signals. The red curve ranges between 0.007% and 0.011%, and the range of the blue curve is 0.017% and 0.022% in the AM tests. In the PM tests, the values of the red curve increase from 0.005% to 0.33%, and those of the blue curve increase from 0.018% to 0.33%. According to the above analysis, PM signals can be decomposed into multiple components. As the modulation frequency increases, $f_0 \pm 2f_m$, $f_0 \pm 3f_m$, and the other components may be suppressed, causing an increase in phasor errors. This part of the error is considered in the general error models; thus, the phasor accuracy is better than the requirements. In addition, the phasor errors increase due to interferences. However, the increase in the errors is relatively small, and the phasor accuracy still satisfies the TVE requirement of 3% for M-class PMUs. The results indicate that the PMU prototype can extract the phasor of the high-frequency oscillation signals and monitor the SSO successfully.

b) Performance Comparison

The DFT and Taylor weighted least squares (TWLS) methods may be used as phasor estimators. Due to the disadvantages of these methods, some improvements have been considered. In this disclosure, the Clarke transformation-based DFT algorithm (CT-DFT) and the TWLS-IpDFT are compared with the proposed method.

Figure 5:
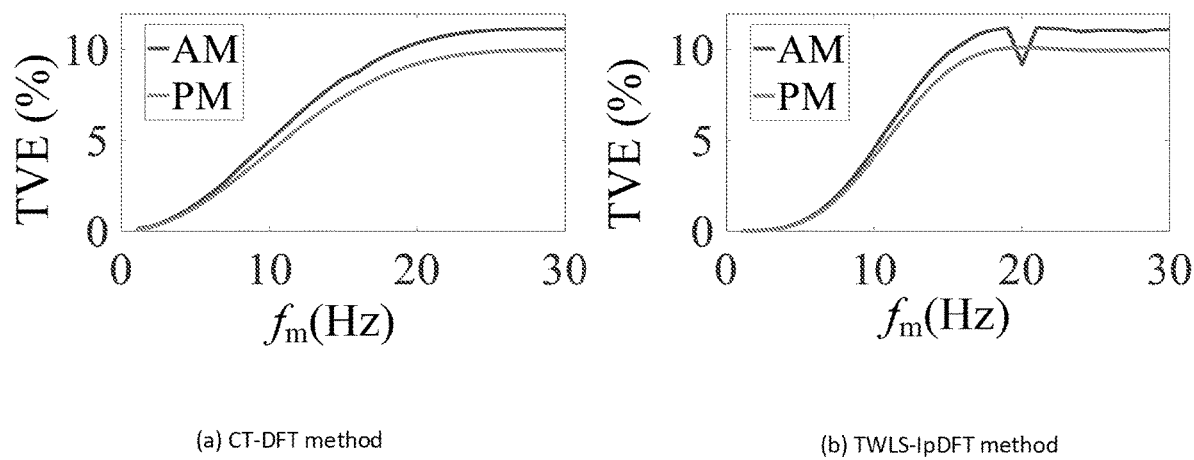
FIG. 5 shows example phasor errors obtained from interference tests.

FIG. 5 shows example phasor errors obtained from interference tests. In particular, FIG. 5 shows phasor errors of the CT-DFT (a) and TWLS-IpDFT (b) methods in the AM and PM tests with interference signals (the AM curve is the curve on the top). The phasor errors of both methods rise rapidly with an increase in the modulation frequency in the AM and PM tests. The maximum TVE is 11%; thus, these two methods are not suitable for extracting the phasor of high-frequency oscillation signals.

Example Design Procedure for Phasor Estimation

In one example embodiment, a general design method for phasor estimation in different applications is described. The design method can be carried out offline using a computer, and the designed phasor algorithm can be implemented in a PMU prototype to estimate the synchrophasor in real time. FIG. 1 shows an example method 100 for estimating the phasor.

In a first step, the computer can obtain the measurement requirements, e.g., a reporting rate 101, a measurement bandwidth 102, and error limitations 103 under static and dynamic conditions. For example, the computer can receive limits or upper bounds for total vector error (TVE), amplitude error (AE), phase error (PE) (collectively, 104), frequency error (FE) (105) and rate-of-change-of-frequency error (RFE) (106). More specifically, the computer can receive these error limits for the passband range and stopband range, i.e., $TVE_{pass}$ ($TVE_{stop}$), $AE_{pass}$ ($AE_{stop}$), $PE_{pass}$ ($PE_{stop}$), $FE_{pass}$ ($FE_{stop}$), and $RFE_{pass}$ ($RFE_{stop}$).

In a second step, the computer can calculate the parameters for a complex band-pass filter. The filter parameters include the passband range 111, passband gain 114, stopband range 112, and stopband gain 115. For each class of PMUs, the passband range and stopband range can be obtained using the reporting rate and the measurement bandwidth. The passband range is equal to the measurement bandwidth. Let $F_r$ denote the reporting rate, and thus the stopband range is 0~(50−$F_r$/2) Hz and over (50+$F_r$/2) Hz. For example, when the reporting rate is 50 Hz, the measurement bandwidth of M-class PMU is 45 Hz~55 Hz. Therefore, the passband range of the complex bandpass filter is 45 Hz~55 Hz, and the stopband range is 0 Hz-25 Hz and over 75 Hz.

The upper bounds of the passband gain (δ) and the stopband gain (λ) can be determined using error models 113. In particular, the passband gain (δ) for the phase modulation test is the minimum range obtained using the following:

$$\delta \le \frac{(PE_{pass} + k_p)J_0(k_p) - 2J_1(k_p)}{(PE_{pass} + k_p)J_0(k_p) + 2J_1(k_p)} \quad (52)$$

$$\delta \le (TVE_{pass} - TVE_2)/(J_0(k_p) + 2J_1(k_p)) \quad (53)$$

$$\delta \le \frac{(2\pi \cdot FE_{pass}D(f_m) + k_p) \cdot J_0(k_p) - 2J_1(k_p)}{(2\pi \cdot FE_{pass}/D(f_m) + k_p) \cdot J_0(k_p) + 2J_1(k_p)} \quad (54)$$

where $J_n(k_p)$ is a first Bessel function of n order, $k_p$ is the phase modulation depth, $f_m$ is the modulation frequency, $TVE_2$ depends on $f_0 \pm 2f_m$, $f_0 \pm 3f_m$, ($f_0$ is the fundamental frequency), and D(f) is the magnitude response of a differentiator used to estimate a frequency. The range of passband gain for other test signals can be determined using the same analysis.

Moreover, the stopband gain (λ) for the negative fundamental component is the minimum range obtained using the following:

$$|H(f_i)| \le \frac{1}{k_i} \frac{\tan PE_{stop}}{\sqrt{1 + \tan^2 PE_{stop}}} \quad (55)$$

$$|H(f_i)| \le TVE_{stop}/k_i \quad (56)$$

$$|H(f_i)| \le \frac{1}{k_i} \frac{2\pi \cdot FE_{stop}/D(f_i - f_0)}{1 + 2\pi \cdot FE_{stop}/D(f_i - f_0)} \quad (57)$$

Where H(f) is the frequency response of the designed complex bandpass filter, $f_i$ is the frequency of one interference signal, $k_i$ is the ratio of the magnitude of the interference signal to the fundamental magnitude and D(f) is the magnitude response of a differentiator used to estimate a frequency. When the harmonic or inter-harmonic is in the power signal, the stopband gain can be determined by:

$$E(\lambda) = |E(X_1^+(t), z_1(t)) + E(X_2^+(t), z_2(t)) - E(X_3^+(t), z_3(t))| \le \quad (58)$$
$$|E(X_1^+(t), z_1(t))| + |E(X_2^+(t), z_2(t))| + |E(X_3^+(t), z_3(t))| \le E_{stop}$$

where $E(X^+(t), z(t))$ is denoted as the estimation error between $X^+(t)$ and $z(t)$, and $$z(t) = X_m e^{j2\pi f_0 t} + |H(-f_0)|X_m e^{-j2\pi f_0 t} + \\ |H(f_i)|k_i X_m e^{j2\pi f_i t} + |H(-f_i)|k_i X_m e^{-j2\pi f_i t} \\ = [X_m e^{j2\pi f_0 t} + |H(-f_0)|X_m e^{-j2\pi f_0 t}] + \\ [X_m e^{j2\pi f_0 t} + |H(f_i)|k_i X_m e^{j2\pi f_i t}] - \\ [X_m e^{j2\pi f_0 t} - |H(-f_i)|k_i X_m e^{-j2\pi f_i t}] \\ = z_1(t) + z_2(t) - z_3(t) \quad (59)$$

$$X^+(t) = X_m e^{j2\pi f_0 t} = X_m e^{j2\pi f_0 t} + X_m e^{j2\pi f_0 t} - X_m e^{j2\pi f_0 t} \\ = X_1^+(t) + X_2^+(t) - X_3^+(t) \quad (60)$$

where $X_m$ is the magnitude of the fundamental signal.

In a third step, the computer can design a complex band-pass filter. In particular, using the passband range, passband gain, stopband range, and stopband gain a complex band-pass filter can be designed using the WLS algorithm or iterative reweighting WLS (IRWLS) algorithm. The WLS or IRWLS algorithm is an optimal design method and can customize the gain at different frequency bands. In addition, these two algorithms have better filtering characteristics than other design methods (such as window function method and frequency sampling method) under the same filter order.

In a fourth step, the computer can check the response time and reporting latency by simulation tests. The response time is the time to transition between two steady-state measurements before and after a step change is applied to the input. It shall be determined as the difference between the time that the measurement leaves a specified accuracy limit and the time it reenters and stays within that limit when a step change is applied to the PMU input. The reporting latency is defined as the maximum time interval between the data report time as indicated by the data time stamp, and the time when the data becomes available at the PMU output. In particular, after designing a complex band-pass filter, one may check whether the filter's time response and latency depending on data window meet the application requirements. If the filter's time response and latency depending on data window meet the application requirements, the PMU prototype may use the complex band-pass filter to estimate the phasor. The phasor estimation filter h(k) can be used to develop the phasor algorithm, and then the synchrophasor can be estimated. In particular, when the band-pass filter coefficients are h(k) (0≤k≤2N, where 2N is the filter order), a positive fundamental component can be obtained by:

$$z(k) = \sum_{i=0}^{2N} h(i)y(k - N + i) \quad (61)$$

where y(k) is a discrete power signal, and z(k) is a measured positive fundamental component.

Additionally, the synchrophasor can be obtained by:

$$\dot{X}(k) = z(k)e^{-j2\pi f_n t_k} \quad (62)$$

where $\dot{X}(k)$ is the discrete synchrophasor, $f_n$ is the nominal frequency, and $t_k$ is the report time.

If the filter's time response or latency depending on data window do not meet the application requirements, the complex band-pass filter may be redesigned after adjusting related requirements. For example, the error limitations of the passband and stopband ($E_{pass}$ and $E_{stop}$) can be adjusted.

Then, based on the new error limitations, the complex bandpass filter is redesigned according to the above steps.

Using the phasor algorithm, the synchrophasor can be estimated in various classes of the PMU. These classes can include the P-class PMU for protection and control applications, M-class PMU for wider measurement bandwidth, and S-class PMU for monitoring the sub-synchronous oscillation.

Hardware Implementation of a PMU Prototype

Figure 6:
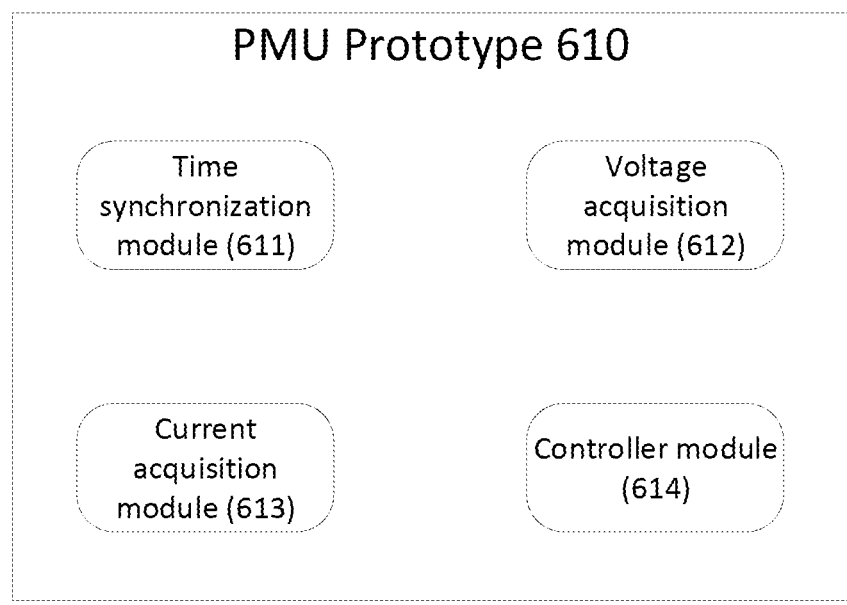
FIG. 6 shows an example PMU prototype according to an example embodiment.

A PMU may be tested using a high-precision signal generator to demonstrate the practical application of the disclosed methods. FIG. 6 shows an example PMU prototype according to an example embodiment. The PMU prototype 610 can consist of a time-synchronization module 1511, a voltage acquisition module 612, a current acquisition module 613, and a controller module 614. In one example embodiment, NI 9467, NI 9244, NI 9246, and NI cRIO 9039 from the National Instruments can be selected as PMU prototype hardware.

The NI 9467 is a synchronous timing board that can receive GPS signals; it sends one pulse per second (PPS) to generate a 10 kHz sampling clock. The NI 9244 is a voltage acquisition board with a ±400 V input range and 4 channels; the NI 9246 is a current acquisition board with a ±20 A input range and 3 channels. The NI 9244 and 9246 are 24-bit A/D converters and have a maximum sampling frequency of 50 kHz. The NI cRIO 9039 is a real-time embedded controller with 2 GB RAM and a 1.91 GHz processor. It has eight extended slots to install boards and a built-in field-programmable gate array (FPGA) terminal to process the sampled data rapidly. The different classes of the phasor estimation methods can be programmed into the controller to measure the phasor, frequency, and ROCOF.

A high-accuracy signal generator (e.g., Omicron CMC256-plus) can be used as the reference generator to verify the estimation accuracy of the PMU prototype. A computer can control the signal generator to send out test signals and produce reference measurements according to the mathematical model of the test signal. The mathematical models can be defined in the PMU standards, and the reference phasor, frequency, and ROCOF can be derived from them. Then, the PMU prototype samples the test signals and estimates the measurements. Finally, the estimation accuracy can be obtained by comparing the reference data and the measurements. The signal generator and PMU prototype can be synchronized with GPS.

Technical Implementation of a Controller

Figure 7:
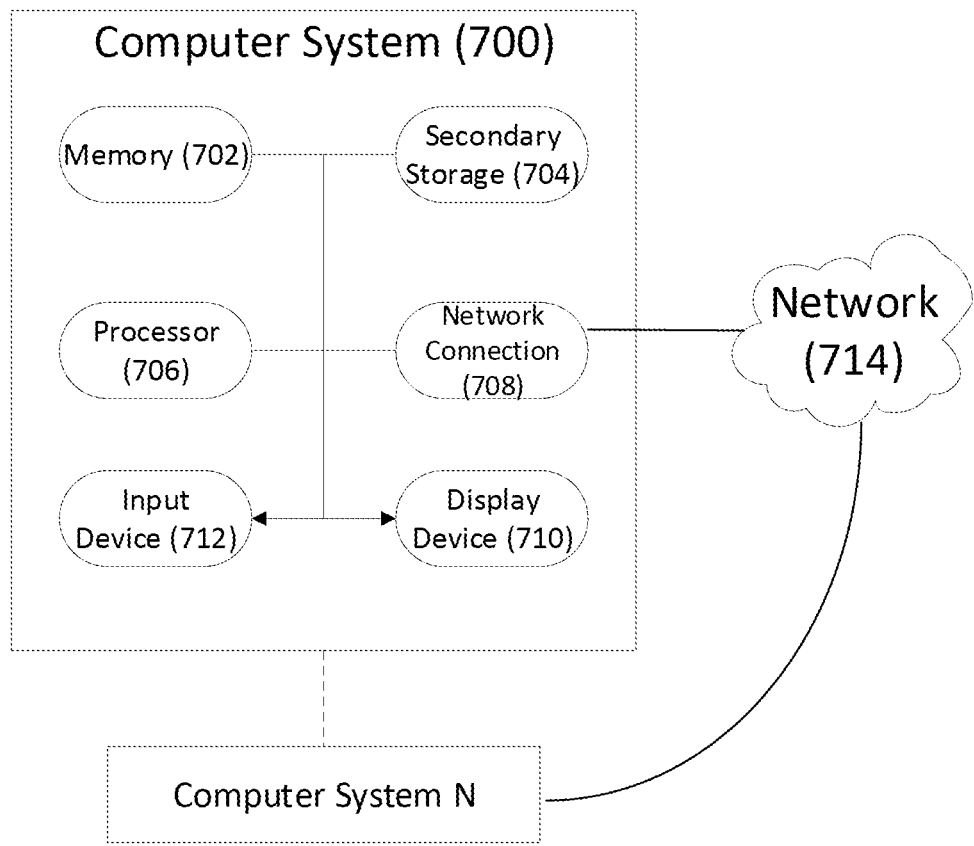
FIG. 7 illustrates exemplary hardware components for a server.

FIG. 7 illustrates exemplary hardware components of a controller, which can be a computer system. A computer system 700, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 700, may run an application (or software) and perform the steps and functionalities described above. Computer system 700 may connect to a network 714, e.g., Internet, or other network, to receive inquiries, obtain data, and transmit information and incentives as described above.

The computer system 700 typically includes a memory 702, a secondary storage device 704, and a processor 706. The computer system 700 may also include a plurality of processors 706 and be configured as a plurality of, e.g., bladed servers, or other known server configurations. The computer system 700 may also include a network connection device 708, a display device 710, and an input device 712.

The memory 702 may include RAM or similar types of memory, and it may store one or more applications for execution by processor 706. Secondary storage device 704 may include a hard disk drive, floppy disk drive, CD-ROM drive, or other types of non-volatile data storage. Processor 706 executes the application(s), such as those described herein, which are stored in memory 702 or secondary storage 704, or received from the Internet or other network 714. The processing by processor 706 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 700 may store one or more database structures in the secondary storage 704, for example, for storing and maintaining the information necessary to perform the above-described functions. Alternatively, such information may be in storage devices separate from these components.

Also, as noted, processor 706 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 700.

The input device 712 may include any device for entering information into the computer system 700, such as a touch-screen, keyboard, mouse, cursor-control device, microphone, digital camera, video recorder or camcorder. The input and output device 712 may be used to enter information into GUIs during performance of the methods described above. The display device 710 may include any type of device for presenting visual information such as, for example, a computer monitor or flat-screen display (or mobile device screen). The display device 710 may display the GUIs and/or output from sub-system components (or software).

Examples of the computer system 700 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 700 is shown in detail, system 700 may use multiple computer systems or servers as necessary or desired to support the users and may also use back-up or redundant servers to prevent network downtime in the event of a failure of a particular server. In addition, although computer system 700 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 700, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A design method for phasor estimation in different classes of phasor measurement units (PMUs) using a computer including a computer processor and a computer memory and a PMU prototype including a PMU processor and a PMU memory, the method comprising:

receiving, at the computer processor, a reporting rate, a measurement bandwidth, and error limitations including $TVE_{pass}$ ($TVE_{stop}$), $AE_{pass}$ ($AE_{stop}$), $PE_{pass}$ ($PE_{stop}$), $FE_{pass}$ ($FE_{stop}$), and $RFE_{pass}$ ($RFE_{stop}$);

calculating, using the computer processor, parameters for a complex band-pass filter, wherein:

the parameters include a passband range, a passband gain ($\delta$) for a phase modulation signal, a stopband range, and a stopband gain ($\lambda$) for a negative fundamental component;

the passband range and the stopband range are calculated using the reporting rate and the measurement bandwidth;

the passband gain ($\delta$) for a phase modulation signal is a minimum range obtained using the following:

$$\delta \leq \frac{(PE_{pass} + k_p)J_0(k_p) - 2J_1(k_p)}{(PE_{pass} + k_p)J_0(k_p) + 2J_1(k_p)} \quad (1)$$

$$\delta \leq (TVE_{pass} - TVE_2)/(J_0(k_p) + 2J_1(k_p)) \quad (2)$$

$$\delta \leq \frac{(2\pi \cdot FE_{pass}/D(f_m) + k_p) \cdot J_0(k_p) - 2J_1(k_p)}{(2\pi \cdot FE_{pass}/D(f_m) + k_p) \cdot J_0(k_p) + 2J_1(k_p)} \quad (3)$$

where $J_n(k_p)$ is a first Bessel function of n order, $f_m$ is a modulation frequency, $k_p$ is a phase modulation depth, $TVE_2$ depends on $f_0 \pm 2f_m$, $f_0 \pm 3f_m$, $f_0$ is a fundamental frequency, and $D(f)$ is a magnitude response of a differentiator used to estimate a frequency; and the stopband gain ($\lambda$) for a negative fundamental component is a minimum range obtained using the following:

$$|H(f_i)| \leq \frac{1}{k_i} \frac{\tan PE_{stop}}{\sqrt{1 + \tan^2 PE_{stop}}} \quad (4)$$

-continued $$|H(f_i)| \le TVE_{stop}/k_i \tag{5}$$

$$|H(f_i)| \le \frac{1}{k_i} \frac{2\pi \cdot FE_{stop}/D(f_i - f_0)}{1 + 2\pi \cdot FE_{stop}/D(f_i - f_0)} \tag{6}$$

where H(f) is a frequency response of the designed complex bandpass filter, $f_i$ is a frequency of one interference signal, $k_i$ is a ratio of a magnitude of the interference signal to a fundamental magnitude and D(f) is the magnitude response of a differentiator used to estimate a frequency;

calculating the stopband gain by:

$$E(\lambda) = |E(X_1^+(t), z_1(t)) + E(X_2^+(t), z_2(t)) - E(X_3^+(t), z_3(t))| \le \tag{7}$$
$$|E(X_1^+(t), z_1(t))| + |E(X_2^+(t), z_2(t))| + |E(X_3^+(t), z_3(t))| \le E_{stop}$$

where $E(X^+(t), z(t))$ is denoted as the estimation error between $X^+(t)$ and $z(t)$, and $$\begin{aligned} z(t) &= X_m e^{j2\pi f_0 t} + |H(-f_0)|X_m e^{-j2\pi f_0 t} + \\ &\quad |H(f_i)|k_i X_m e^{j2\pi f_i t} + |H(-f_i)|k_i X_m e^{-j2\pi f_i t} \\ &= [X_m e^{j2\pi f_0 t} + |H(-f_0)|X_m e^{-j2\pi f_0 t}] + \\ &\quad [X_m e^{j2\pi f_0 t} + |H(f_i)|k_i X_m e^{j2\pi f_i t}] - \\ &\quad [X_m e^{j2\pi f_0 t} - |H(-f_i)|k_i X_m e^{-j2\pi f_i t}] \\ &= z_1(t) + z_2(t) - z_3(t) \end{aligned} \tag{8}$$

$$\begin{aligned} X^+(t) &= X_m e^{j2\pi f_0 t} \\ &= X_m e^{j2\pi f_0 t} + X_m e^{j2\pi f_0 t} - X_m e^{j2\pi f_0 t} \\ &= X_1^+(t) + X_2^+(t) - X_3^+(t) \end{aligned} \tag{9}$$

where $X_m$ is the magnitude of the fundamental signal, designing, using the computer processor, a complex band-pass filter using an iterative reweighting WLS (IRWLS) algorithm;

checking, using the computer processor, a response time and a reporting latency;

wherein the reporting latency is a maximum time interval between a data report time as indicated by a data time stamp, and a time when the data becomes available at a PMU output;

if the response time and the reporting latency match a set of predetermined requirement thresholds, estimating, using the PMU processor:

a phasor by:

$$z(k) = \sum_{i=0}^{2N} h(i)y(k - N + i) \tag{10}$$

where band-pass filter coefficients are h(k) (0≤k≤2N, where 2N is a filter order), y(k) is a discrete power signal, and z(k) is a measured positive fundamental component;

a synchrophasor by:

$$\dot{X}(k) = z(k)e^{-j2\pi f_n t_k} \tag{11}$$

where $\dot{X}(k)$ is a discrete synchrophasor, $f_n$ is a nominal frequency, and $t_k$ is a report time;

if the response time and the reporting latency do not match the set of predetermined requirement thresholds, redesigning the complex band-pass filter using updated error limitations wherein redesigning the complex band-pass filter involves adjusting a passband $E_{pass}$ and a stopband $E_{stop}$; and wherein the design method is implemented in a P-class PMU for protection and control applications, an M-class PMU for wider measurement bandwidth, or an S-class PMU for monitoring a sub-synchronous oscillation.

\* \* \* \* \*